(12) United States Patent
Deguchi (10) Patent No.: US 7,764,309 B2
(45) Date of Patent: Jul. 27, 2010

(54) IMAGE TAKING APPARATUS, IMAGE PROCESSING METHOD, AND IMAGE PROCESSING PROGRAM FOR CONNECTING INTO A SINGLE IMAGE A PLURALITY OF IMAGES TAKEN BY A PLURALITY OF IMAGING UNITS DISPOSED SUCH THAT VIEWPOINTS COINCIDE WITH EACH OTHER

(75) Inventor: Satoshi Deguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 11/610,225

(22) Filed: Dec. 13, 2006

(65) Prior Publication Data

US 2007/0132863 A1 Jun. 14, 2007

(30) Foreign Application Priority Data

Dec. 14, 2005 (JP) ............................. 2005-360811

(51) Int. Cl.
*H04N 5/225* (2006.01)
*H04N 7/00* (2006.01)
*G06K 9/36* (2006.01)
*G06K 9/32* (2006.01)

(52) U.S. Cl. ...................... 348/218.1; 348/38; 382/284; 382/295

(58) Field of Classification Search ................ 348/36, 348/38, 47, 48, 218.1; 382/294, 295, 284, 382/285

See application file for complete search history.

(56) References Cited

U.S. PATENT DOCUMENTS

| 5,657,073 | A  | * | 8/1997  | Henley ......................... 348/38 |
| 5,668,595 | A  |   | 9/1997  | Katayama et al. |
| 6,097,430 | A  | * | 8/2000  | Komiya et al. ........... 348/218.1 |
| 6,211,911 | B1 | * | 4/2001  | Komiya et al. ........... 348/218.1 |
| 6,995,790 | B2 | * | 2/2006  | Higurashi et al. ......... 348/218.1 |
| 7,084,904 | B2 | * | 8/2006  | Liu et al. .................. 348/218.1 |
| 7,177,013 | B2 | * | 2/2007  | Aoyama ..................... 356/4.04 |
| 7,215,364 | B2 | * | 5/2007  | Wachtel et al. ........... 348/218.1 |
| 7,277,118 | B2 | * | 10/2007 | Foote .......................... 348/36 |
| 7,304,680 | B2 | * | 12/2007 | Kohler et al. ............... 348/335 |

(Continued)

FOREIGN PATENT DOCUMENTS

JP   08256288 A   *   10/1996

(Continued)

*Primary Examiner*—John M Villecco
(74) *Attorney, Agent, or Firm*—K&L Gates LLP (57) ABSTRACT

An image taking apparatus including a plurality of imaging units each including a lens with a variable focal distance and an image sensing device is provided. The plurality of imaging units are disposed such that their viewpoints are substantially coincident with each other and image areas partially overlap each other so as to allow it obtain a wide angle image by connecting a plurality of images obtained by the imaging units. Each imaging unit includes a set of mapping tables each of which represents the correspondence, for a particular focal distance, between a particular coordinate system and a coordinate system in which an image taken by each image sensing device is represented. Each imaging unit further includes a controller adapted to select a mapping table corresponding to the focal distance, and a mapping unit adapted to map the image into the particular coordinate system according to the selected mapping table.

11 Claims, 5 Drawing Sheets

U.S. PATENT DOCUMENTS

| | | |
|---|---|---|
| 7,307,655 B1 * | 12/2007 | Okamoto et al. ......... 348/222.1 |
| 7,505,633 B2 * | 3/2009 | Kitajima ..................... 382/276 |
| 7,529,424 B2 * | 5/2009 | Ahiska ....................... 382/275 |
| 2005/0007478 A1 * | 1/2005 | Ahiska ....................... 348/335 |
| 2006/0114332 A1 | 6/2006 | Yoshikawa |
| 2006/0165309 A1 * | 7/2006 | Yachi et al. ................ 382/284 |
| 2007/0291185 A1 * | 12/2007 | Gelb et al. .................. 348/745 |

FOREIGN PATENT DOCUMENTS

| | | |
|---|---|---|
| JP | 2974500 | 11/1999 |
| JP | 2004-184862 | 7/2004 |

\* cited by examiner

IMAGE TAKING APPARATUS, IMAGE PROCESSING METHOD, AND IMAGE PROCESSING PROGRAM FOR CONNECTING INTO A SINGLE IMAGE A PLURALITY OF IMAGES TAKEN BY A PLURALITY OF IMAGING UNITS DISPOSED SUCH THAT VIEWPOINTS COINCIDE WITH EACH OTHER

CROSS REFERENCES TO RELATED APPLICATIONS

The present application claims priority to Japanese Patent Application JP 2005-360811 filed in the Japanese Patent Office on Dec. 14, 2005, the entire contents of which are incorporated herein by reference.

BACKGROUND

The present application relates to an image taking apparatus, an image processing method, and a computer program executable on a computer to implement the image processing method, for connecting into a single image a plurality of images taken by a plurality of imaging units disposed such that viewpoints (focal points) coincide with each other.

It is known to dispose a plurality of imaging optical systems (imaging means) such that image areas thereof partially overlap each other thereby allowing it take a panoramic moving image (or a wide-angle image). However, there is large parallax among imaging optical systems, and this makes it difficult to precisely connect the plurality of image areas via the overlapping areas.

Japanese Patent No. 2974500 discloses a multi-lens image taking apparatus configured to detect registration errors in overlapping areas between adjacent images output from imaging systems, depending on zooming and/or focus, and adjust the angle of convergence between adjacent imaging systems so as to minimize the registration errors.

However, in the method disclosed in Japanese Patent No. 2974500, when overlapping areas include objects at different distances, it is difficult to precisely correct registration errors for all objects.

If an image taking apparatus is configured using a plurality of imaging optical systems having small or no parallax, it is possible to precisely connect a plurality of images via overlapping areas.

However, when focus is changed, a corresponding change in focal distance causes registration errors in overlapping areas between images taken by adjacent imaging optical systems, which cannot be corrected without causing degradation in image quality.

SUMMARY

Thus, it is desirable to provide a technique to precisely connect images taken by a plurality of imaging systems with small registration errors in overlapping areas between adjacent images regardless of focus values of respective imaging systems.

In view of the above, the present application in an embodiment provides an image taking apparatus including a plurality of imaging means each including a lens with a variable focal distance and an image sensing device, the plurality of imaging means being disposed such that their viewpoints are substantially coincident with each other and image areas partially overlap each other so as to allow it obtain a wide angle image by connecting a plurality of images obtained by the respective imaging means, each imaging means including a set of a plurality of mapping tables prepared for various respective values of the focal distance, each mapping table representing the correspondence for one of the various values of the focal distance between a particular coordinate system and a coordinate system in which an image taken by each image sensing device is represented, a controller adapted to select a mapping table corresponding to a focal distance used to take images by the image sensing devices, and a mapping unit adapted to map each image into the particular coordinate system in accordance with the correspondence described in the mapping table selected by the controller.

In this image taking apparatus configured in the above-described manner, the mapping table is dynamically switched in accordance with a change in the focal distance, thereby allowing the images represented by the mapped image data output from the plurality of imaging systems to be precisely connected to each other via overlapping areas regardless of the focal distance.

The present application in an embodiment also provides an image processing method of obtaining a wide-angle image by connecting images taken by a plurality of imaging means each including a lens with a variable focal distance and an image sensing device, the plurality of imaging means being disposed such that their viewpoints are substantially coincident with each other and image areas partially overlap each other, comprising the steps of selecting a mapping table from a set of a plurality of mapping tables prepared for various respective values of the focal distance used in an image taking operation, each mapping table representing the correspondence for one of the various values of the focal distance between a particular coordinate system and a coordinate system in which an image taken by each image sensing device is represented, and mapping each image taken by each image sensing device into the particular coordinate system in accordance with the correspondence described in the selected mapping table so that the image mapped into the particular coordinate system in accordance with the selected mapping table and the image mapped into the particular coordinate system by an adjacent imaging means overlap each other in an overlapping area which is maintained fixed regardless of the focal distance.

In this image processing method, the mapping table is dynamically switched in accordance with a change in the focal distance, thereby allowing the images represented by the mapped image data output from the plurality of imaging systems to be precisely connected to each other via overlapping areas regardless of the focal distance.

As described above in an embodiment, advantage is provided that images taken by a plurality of imaging systems are precisely connected to each other via overlapping areas between adjacent images regardless of the focus values (the focal distances) of the respective imaging systems.

Additional features and advantages are described herein, and will be apparent from, the following Detailed Description and the figures.

DETAILED DESCRIPTION

Specific embodiments are described below with reference to FIGS. 1-7. In the embodiments described below, it is assumed by way of example that the image taking apparatus is a video camera for use as a monitor camera or the like.

Figure 1:
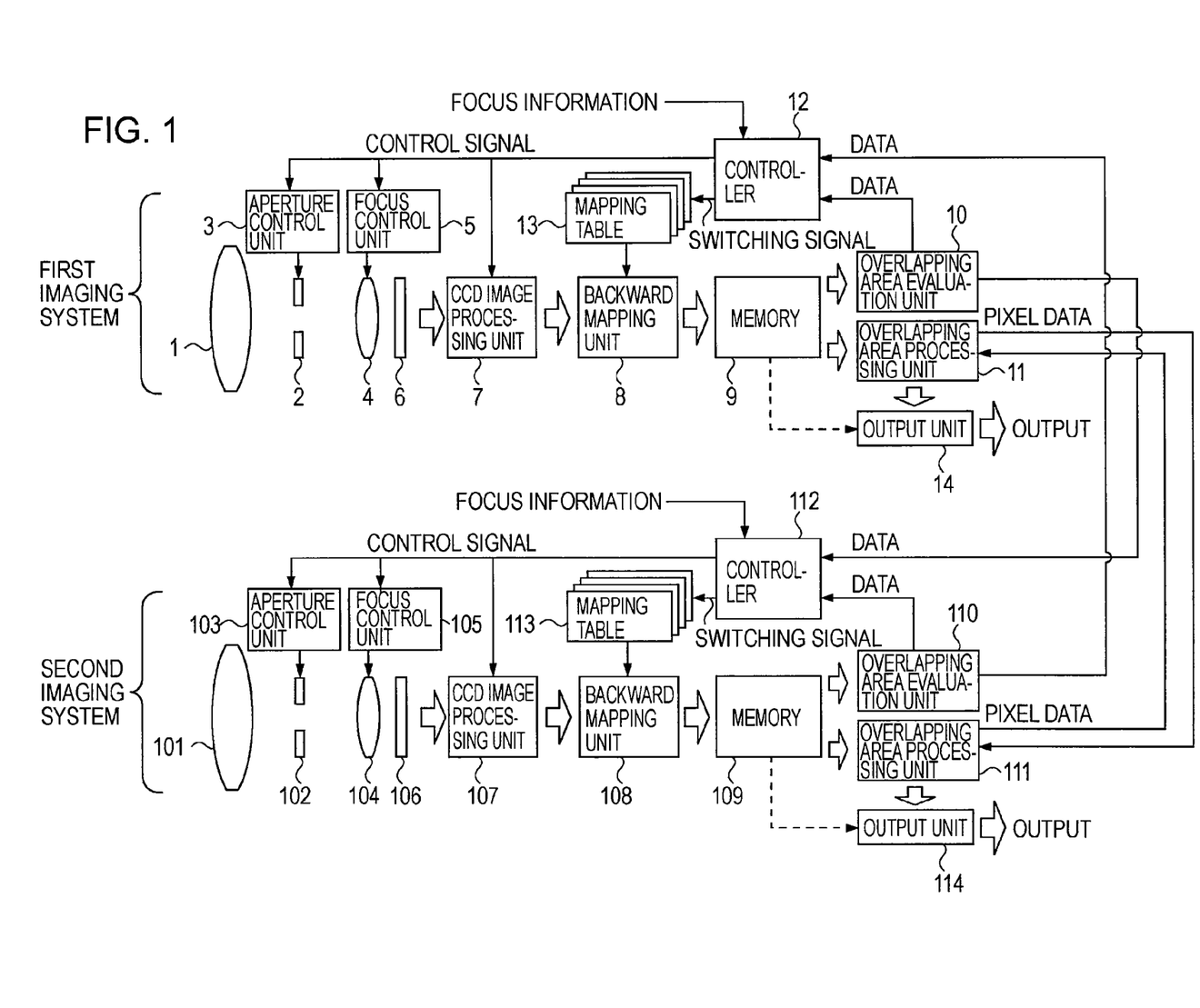
FIG. 1 is a block diagram of an image taking apparatus including two imaging systems according to an embodiment.

FIG. 1 shows an image taking apparatus including two imaging systems according to an embodiment. As shown in FIG. 1, the image taking apparatus includes a first and second imaging systems (imaging means) which are disposed such that the viewpoints (focal points) of the two imaging systems coincide with each other and such that image areas of adjacent imaging systems (the first and second imaging systems in this case) partially overlap each other. The image taking apparatus of this type is called a "co-viewpoint multiple optical system camera". In the image taking apparatus of this type, because the imaging systems are disposed such that the viewpoints thereof are coincident with each other, there is no parallax among images formed by the plurality of imaging systems. Thus, it is possible to seamlessly connect the plurality of images by properly setting the projection center and projecting input images onto a single flat image plane (or non-planar image surface). Various methods to connect a plurality of images are known. For example, a method is disclosed in Japanese Unexamined Patent Application Publication No. 2004-184862.

The first imaging system includes an imaging optical system including lenses 1 and 4, an aperture 2, and a CCD (Charge Coupled Device) serving as an image sensing device, a CCD image processing unit 7, a backward mapping unit 8, a rewritable memory 9 (storage unit), an overlapping area evaluation unit 10, an overlapping area processing unit 11, a controller 12, a set of mapping tables 13, and an output unit 14. The memory 9 may be of the nonvolatile type or volatile type.

The aperture control unit 3 is a driving unit adapted to control the aperture value of the aperture 2 in accordance with a control signal supplied from the controller 12.

The focus control unit 5 is a driving unit adapted to control the focus (the focal distance) by moving the lens 4 along an optical axis in accordance with a control signal supplied from the controller 12.

When an image is captured via the lenses 1 and 4, the focus value and the aperture 2 are adjusted such that the image is focused on the CCD 6. The CCD image processing unit 7 performs various processes such as an analog-to-digital conversion, a RGB conversion, etc. on the output of the CCD 6. The CCD image processing unit 7 also performs an image quality adjustment such as a color correction on the image signal output from the CCD 6 in accordance with a control signal supplied from the controller 12. Although in the present embodiment the CCD is used as the image sensing device, other types of image sensing devices such as a CMOS (Complementary Metal Oxide Semiconductor) image sensing device may also be used.

The backward mapping unit (mapping unit) 8 performs a process to precisely overlap the image obtained by the first imaging system with the image obtained by the second imaging system. At this stage, the image data obtained via the image processing by the CCD image processing unit 7 of each imaging system includes distortion due to lens distortion of each imaging system, a relative positioning error between the optical systems, and projection of an image in three-dimensional space onto a two-dimensional plane of the CCD 6, and the distortion makes it difficult to obtain a beautiful boundary between the two images. To correct the distortion due to these factors, the backward mapping unit 8 disposed at a stage following the CCD image processing unit 7 performs a backward mapping process (hereinafter, referred to simply as mapping) so as to achieve precise overlapping between the images obtained by the two imaging systems.

The set of mapping tables 13 includes a plurality of mapping tables each of which represents the correspondence for a particular focus value (focal distance) between a particular coordinate system and a coordinate system in which the image taken by the CCD (image sensing device) 6 is represented. Note that the plurality of mapping tables in the set of mapping table 13 are prepared for various different focus values such that each mapping table represents correspondence for one of various different focus values. For example, the correspondence for mapping from the image taken by the CCD 6 to a non-planar image in a three-dimensional coordinate system or further to a two-dimensional plane image is described for each of various different focal distances in one of mapping table. A user is allowed to select whether the image is mapped onto a non-planar image or a two-dimensional-plane image.

The mapping information may be stored in a dedicated mapping table memory during a production process of the image taking apparatus or may be stored in the memory 9 or the like so that the mapping information is read from the memory 9 when the power of the image taking apparatus is turned on.

The mapping table 13 used in the mapping is properly switched depending on the focus value. More specifically, the controller 12 responsible for controlling the focus selects a proper mapping table corresponding to the focus value employed to take an image. In accordance with the mapping information described in the selected mapping table, the backward mapping unit 8 performs the mapping so that the overlapping part of the output image data is mapped to a particular area of the memory 9 disposed at a stage following the backward mapping unit 8.

The overlapping area evaluation unit 10 reads the overlapping part between the image data output by the adjacent imaging systems from the memory 9 and evaluates the image quality thereof. The result of the evaluation is sent to the controller 12.

The controller 12 an operation/process control unit such as a CPU (Central Processing Unit), which controls various operations and processes using a RAM (Random Access Memory) as a work area in accordance with a computer program such as a program to control the whole image taking apparatus, an image processing program, etc. stored in a ROM (Read Only Memory). When the controller 12 receives the result of the evaluation made by the overlapping area evaluation unit 110 of the second imaging system adjacent to the first imaging system, the controller 12 precisely determines the difference in color from that obtained in the second imaging system. The controller 12 adjusts the aperture value of the aperture 2 via the aperture control unit 3 and/or adjusts the image quality via the CCD image processing unit 7 so as to minimize the color difference.

The controller 12 acquires from the lens 4 information associated with the focus value employed when an image was taken or acquires information associated with the manual focusing operation performed by a user when an image was taken from the operation unit, and the controller 12 stores the acquired information.

The overlapping area processing unit 11 sends image data (pixel data) with the overlapping-area size to the overlapping area processing unit 111 of the second imaging system adjacent to the first imaging system, and acquires image data with the overlapping-area size from the overlapping area processing unit 111 of the second imaging system. If the overlapping area processing unit 11 receives the image data with the overlapping-area size from the second imaging system adjacent to the first imaging system, the overlapping area processing unit 11 performs a blending process such as an alpha blending process or a texture blending process as an overlapping area treatment process.

The resultant image data subjected to the blending process is output to an external device via the output unit 14. The external device is allowed to obtain an image with a desired angle of view or a panoramic image with high image quality simply by placing, side by side, the images output from the respective image taking apparatus. As for the external device to which the image data output from the output unit 14 is input, for example, a display device such as an LCD (Liquid Crystal Display) device or a recording/playback apparatus such as an HDD (Hard Disk Drive) recorder/player may be used.

The second imaging system includes an imaging optical system including lenses 101 and 104, an aperture 102, and a CCD (Charge Coupled Device) 106 serving as an image sensing device, a CCD image processing unit 107, a backward mapping unit 108, a rewritable nonvolatile memory 109, an overlapping area evaluation unit 110, an overlapping area processing unit 111, a controller 112 a mapping table set 113, and an output unit 114. These parts are similar to those of the first imaging system described above, and thus a duplicated explanation thereof is omitted herein.

A method of producing the set of mapping tables 13 is described below. The correspondence between the coordinate system in which the image taken by the image sensing device (CCD 6) is represented and the coordinate system in which the image is represented in a final form can be determined according to a known method, and the mapping tables can be produced according to the determined correspondence. The set of mapping tables 113 can be produced in a similar manner, and thus in the following explanation, the method of producing mapping tables is explained only for the set of mapping tables 13.

As described above, each mapping table 13 is described so as to represent a composite function of a lens distortion correction, a correction of relative positioning errors of optical systems, and a projective transformation of mapping a plane image to an image in three-dimensional space. The lens distortion correction may be made, for example, by a method known as the Tsai's camera model.

Figure 2:
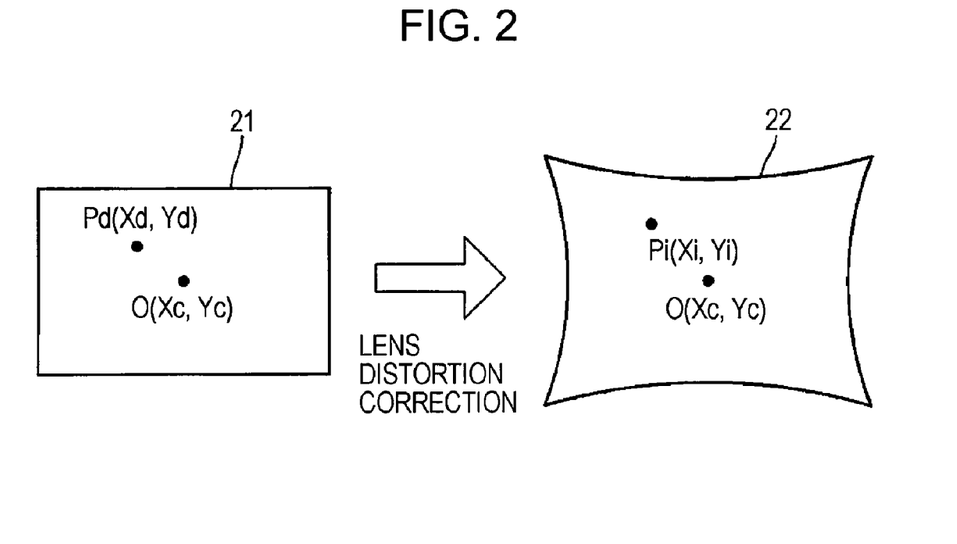
FIG. 2 is a diagram showing an example of a correction of lens distortion.

FIG. 2 shows an example of a correction of lens distortion. In FIG. 2, point O in each of an image 21 in an uncorrected state and an image 22 in a corrected state denotes the center of each image, and (Xc, Yc) denotes coordinates of the point O of each image. Note that the image center is defined as the intersection point of the optical axis of one imaging system and the image plane, that is, the uncorrected image 21 or the corrected image 22. If it is assumed that an arbitrary point Pd(Xd, Yd) of the uncorrected image 21 is converted into a point Pi(Xi, Yi) of the corrected image 22 as a result of the distortion correction, the conversion for the distortion correction can be mathematically represented as follows:

$$Xi = Xd(1 + k1 r^2 + k2 r^4)$$

$$Yi = Yd(1 + k1 r^2 + k2 r^4)$$

$$r = \sqrt{Xd^2 + Yd^2} \qquad (1)$$

where k1 and k2 are arbitrary values other than zero.

The correction of the relative positioning error of the imaging system and the projective transformation can be generally represented in accordance with a pin-hole camera model as follows:

$$\begin{bmatrix} x \\ y \\ z \end{bmatrix} = \begin{bmatrix} f & 0 & Cx \\ 0 & f & Cy \\ 0 & 0 & 1 \end{bmatrix} [R] \begin{bmatrix} Xw \\ Yw \\ Zw \end{bmatrix} \qquad (2)$$

where the left side denotes the camera coordinate system, the first term on the right side denotes a TV matrix, the second term denotes a rotation matrix, the third term denotes a world coordinate system, f denotes the focal distance, and Cx and Cy denote deviations of the imaging system from the image center in the x and y directions. In this equation, the rotation angle R can be represented as follows.

$$R = \begin{bmatrix} \cos Y & \sin Y & 0 \\ -\sin Y & \cos Y & 0 \\ 0 & 0 & 1 \end{bmatrix} \begin{bmatrix} 1 & 0 & 0 \\ 0 & \cos R & \sin R \\ 0 & -\sin R & \cos R \end{bmatrix} \begin{bmatrix} \cos P & 0 & -\sin P \\ 0 & 1 & 0 \\ \sin P & 0 & \cos P \end{bmatrix}$$

where Y, R, and P respectively denote the yaw, the roll, and the pitch of the imaging system.

As described above, the point on the image represented in the image taking coordinate system (camera coordinate system) (x, y, z) is given by the product of coordinates in the world coordinate system (Xw, Yw, Zw), the rotation matrix R and the TV matrix. Note that the TV matrix represents the projective transformation from the world coordinate system to the image taking coordinate system (camera coordinate system).

Because Cx and Cy respectively represent deviations of an imaging system (camera) in the x direction and in the y direction from the optical axis center (image center), and R (roll), P (pitch), and Y (yaw) represent the position of the imaging system (camera), these parameters can be determined via calibration of the imaging system (camera).

Figure 3:
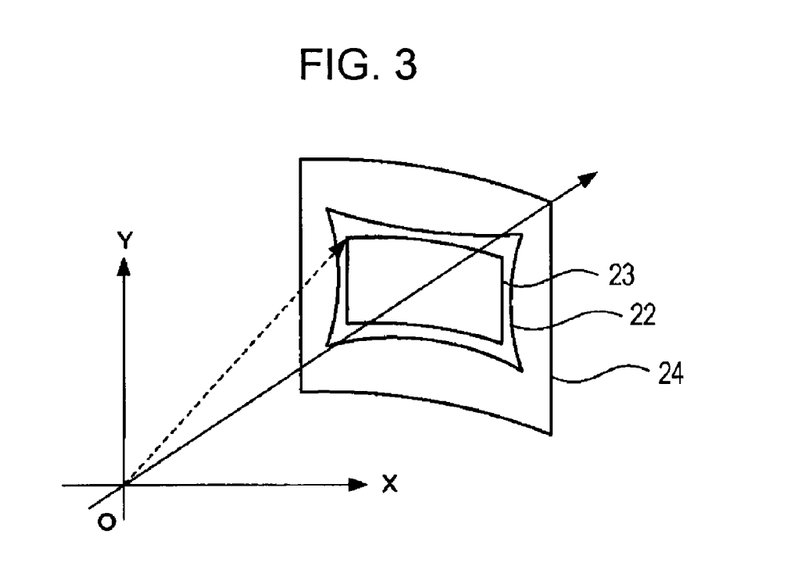
FIG. 3 is a diagram showing an example of mapping of an image onto a cylindrical surface.

After the distortion correction is made, the position error correction and the projective transformation are performed on the image 22 subjected to the distortion correction. More specifically, in the case of the projection onto a cylindrical surface, polar coordinates of the image 23 projected onto the cylindrical surface 24 such as that shown in FIG. 3 are determined and substituted into equation (2). A mapping table is then produced in accordance with the result of the substitution. If mapping tables are produced for respective values of the focal distance f in equation (2), a set of backward mapping tables corresponding to the respective values of the focal distance f is obtained.

Figure 4:
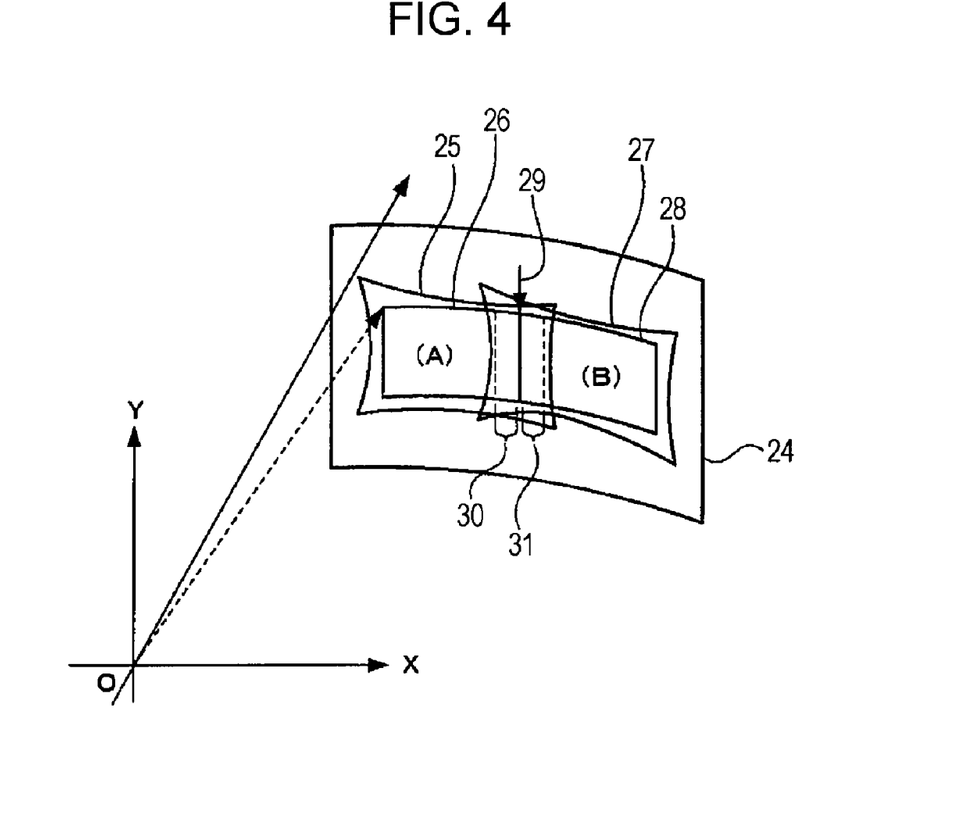
FIG. 4 is a diagram showing two adjacent images mapped onto a cylindrical surface according to an embodiment.

Referring to FIG. 4, the area of the image subjected to the mapping process for each of the plurality of imaging systems is explained below. FIG. 4 shows two output images subjected to the mapping onto a cylindrical surface in the first and second imaging systems. In FIG. 4, reference numerals 25 and 27 denote images obtained by performing the distortion correction on images taken by the respective first and second imaging systems. If the images 25 and 27 subjected to the distortion correction are projected onto the cylindrical surface 24, images 26 and 28 are obtained. That is, the mapping data of the respective images (A) and (B) are given by the images 26 and 28.

In a case in which the images (A) and (B) adjoining each other via a connection line 29 as shown in FIG. 4 are output to an external device, mapping tables are prepared such that an image area including the image (A) with a standard image size as measured on a display and an overlapping area 31 in which the image (A) overlaps the image (B) is covered for the image (A), and an image area including the image (B) with the standard image size as measured on the display and an overlapping area 30 in which the image (B) overlaps the image (A) is covered for the image (B), and the backward mapping is performed. Herein, the images (A) and (B) are images with the standard image size as measured on the display output from the respective imaging systems. The images with the standard image size as measured on the display are unit images forming a wide-angle image. That is, a wide-angle image or a panoramic image is formed by combining a plurality of images with the standard image size as measured on the display.

For the above purpose, each of the image sensing devices of the adjacent imaging systems takes an image including the image (A) or (B) with the standard image size as measured on the display and the overlapping area 31 or 30 in which the image (A) or (B) with the standard image size as measured on the display overlaps with the image (B) or (A) taken by the adjacent imaging system. The overlapping areas 31 and 30 are fixed in size regardless of the focal distance by properly performing mapping depending on the focal distance.

In the case in which the image taking apparatus is used as a monitor camera as in the present embodiment, the zoom ratio is generally fixed to a particular value. However, in some cases, it is desirable to change the zoom ratio in monitor cameras. To meet such a requirement, a set of mapping tables may be prepared for various values of the focal distance and for various values of the zoom ratio. This makes it possible to properly perform mapping by selecting a correct mapping table corresponding to the focal distance and corresponding to the zoom ratio. Thus, it is possible to precisely connect a plurality of images taken by imaging systems via overlapping areas whose size is fixed regardless of the zoom ration.

The mapping of images taken by the first and second imaging systems is described in further detail below.

When the power of the imaging systems is turned on, the set of mapping tables 13 representing the correspondence between the coordinate system in which the image taken by the CCD 6 is represented and a particular coordinate system for each focal distance is read into a storage unit (not shown).

In the first imaging system, the controller 12 selects a mapping table corresponding to the focal distance used in the image taking operation from the mapping table 13. The backward mapping unit 8 maps the image taken via the CCD 6 to an image in a particular coordinate system, for example, to a non-planar image on the cylindrical surface 24, in accordance with the correspondence described in the selected mapping table. The resultant mapped image is stored in the memory 9.

Similarly, in the second imaging system, the image taken via the CCD 106 is mapped into the particular coordinate system in accordance with the mapping table corresponding to the focal distance used in the image taking operation, and the resultant mapped image is stored in the memory 109.

The image stored in the memory 9 of the first imaging system and the image stored in the memory 109 of the second imaging system represent images 26 and 28 mapped onto the cylindrical surface 24 as shown in FIG. 4. These two images 26 and 28 are precisely connected to each other via the overlapping areas 30 and 31 regardless of the focal distance.

Figure 5:
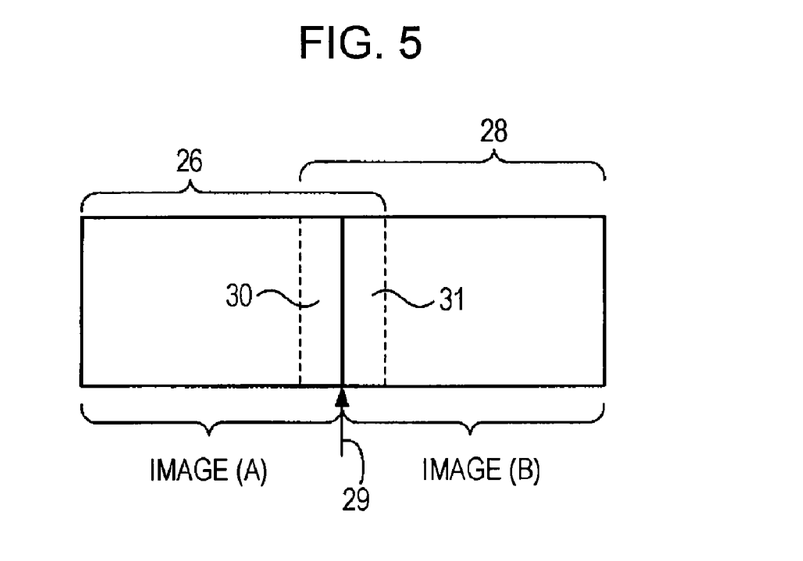
FIG. 5 is a diagram showing an image obtained by developing two output images onto a plane according to an embodiment.

FIG. 5 shows an image obtained by developing the images 26 and 28 on the cylindrical surface 24 shown in FIG. 4 on a plane. The mapping data 26 of the image (A) mapped by the backward mapping unit 8 of the first imaging system includes the image (A) with a standard image size as measured on the display and the image of the overlapping area 31 where the image overlaps the adjacent image (B) of with the standard image size as measured on the display of the second imaging system. Similarly, the mapping data 28 of the image (B) mapped by the backward mapping unit 108 of the second imaging system includes the image (B) with a standard image size as measured on the display and the image of the overlapping area 30 where the image overlaps the adjacent image (A) of with the standard image size as measured on the display of the first imaging system.

In the first and second imaging systems adjacent to each other, the image taken by the first imaging system extends beyond a connection boundary 29 into the overlapping area 31 in which the image overlaps the image (B) with the standard image size as measured on the display taken by the second imaging system, while the image taken by the second imaging system extends beyond the connection boundary 29 into the overlapping area 30 in which the image overlaps the image (A) with the standard image size as measured on the display taken by the first imaging system. Note that the size of the overlapping area 30 is set to be equal to the size of the overlapping area 31.

Because the two images are very precisely aligned with respect to each in the overlapping areas 30 and 31, the aperture 2 (or 102) and the CCD image processing unit 7 (or 107) can be controlled in accordance with the result of the evaluation of the image in the overlapping area in which the image overlaps the image with the standard image size as measured on the display taken by the adjacent imaging system, so that the difference in color between the adjacent imaging systems is minimized.

More specifically, the first imaging system has the overlapping area evaluation unit 10 (FIG. 1) to evaluate the image quality of the image in the overlapping part 30 between the image (A) with the standard image size as measured on the display taken by the first imaging system and the image 28 taken by the second imaging system. Similarly, the second imaging system has the overlapping area evaluation unit 110 to evaluate the image quality of the image in the overlapping part 31 between the image (B) with the standard image size as measured on the display taken by the second imaging system and the image 26 taken by the first imaging system.

As shown in FIG. 1, the data indicating the result of the evaluation made by the overlapping area evaluation unit 10 of the first imaging system is input to the controller 12 of the first imaging system and also to the controller 112 of the second imaging system, and the data indicating the result of the evaluation made by the overlapping area evaluation unit 110 of the second imaging system is input to the controller 112 of the second imaging system and also to the controller 12 of the first imaging system. In accordance with the evaluation results, the controllers 12 and 112 of the first second imaging systems adjust the image quality so that the difference in color in the overlapping areas is minimized.

In the embodiment described above, the image data in the overlapping areas are evaluated by both imaging systems adjacent to each other. Alternatively, the image quality of one of the image data may be fixed as a reference. For example, the image quality of the image obtained in the first imaging system may be fixed, and the image quality of the image obtained in the second imaging system may be adjusted with reference to the image quality of the image obtained in the first imaging system.

Each imaging system has an overlapping area processing unit to perform a particular process on the overlapping part between the image with the standard image size as measured on the display taken by the present imaging system and the image taken by the adjacent imaging system.

More specifically, the first imaging system has an overlapping area processing unit 11 adapted to perform a blending process on the overlapping part 30 between the image (A) with the standard image size as measured on the display of the first imaging system and the image 28 taken by the second imaging system. Similarly, the second imaging system has an overlapping area processing unit 111 adapted to perform a blending process on the overlapping part 31 between the image (B) with the standard image size as measured on the display taken by the second imaging system and the image 26 taken by the first imaging system. Each of the overlapping area processing units 11 and 111 of the first and second imaging systems supplies the RGB pixel data of the overlapping area to the other overlapping area processing unit (FIG. 1). Each of the overlapping area processing units 11 and 111 analyzes the received pixel data in terms of the size and the image quality of the overlapping area of the adjacent imaging system and properly performs the process on the overlapping area in accordance with the analysis result.

More specifically, the overlapping area processing unit 11 of the first imaging system performs the blending process on the image data of the overlapping area 30 shown in FIG. 5 in accordance with the pixel data supplied from the second imaging system adjacent to the first imaging system. After completion of the blending process, the resultant image data of the overlapping area 30 is sent to the output unit 14.

In this process, only the image data of the overlapping area 30 may be sent to the output unit 14, or the image data of the image (A) with the standard image size as measured on the display including the image data of the overlapping area 30 may be sent to the output unit 14 via the overlapping area processing unit 11. In the case in which only the image data of the overlapping area 30 is supplied to the overlapping area processing unit 11, the output unit 14 acquires the remaining image data from the memory 9 and adds the acquired image data to the image data of the overlapping area 30 to obtain the whole image data (A) with the standard image size as measured on the display. The resultant image data (A) with the standard image size as measured on the display is output from the output unit 14 to an external device.

Similarly, in the second imaging system, in accordance with the pixel data from the first imaging system adjacent to the second imaging system, the overlapping area processing unit 111 performs the blending process on the image data of the overlapping area 31 shown in FIG. 5. The resultant image data of the overlapping area 31 is sent to the output unit 114. The output unit 114 outputs the image (B) with standard image size as measured on the display including the image of the overlapping area 31 subjected to the blending process to an external device.

As described above, the image (A) output from the output unit 14 includes the overlapping area 30 that has been subjected to the overlapping process, and the image (B) output from the output unit 114 includes the overlapping area 31 that has been subjected to the overlapping process. This allows the external device to obtain a wide-angle image simply by aligning the image (A) and the image (B) side by side.

Alternatively, the overlapping area treatment process may not be performed and the mapping data of the image (A) and the image (B) including the overlapping part may be supplied to the external device, and the overlapping area treatment process may be performed in the external device. In this case, because the overlapping area treatment process is performed in the external device, the processing load on the image taking apparatus is reduced. Also in this case, the overlapping area is mapped to a particular area, and thus the external device is allowed to perform the overlapping area treatment process without needing any information associated with the image data of the overlapping area. That is, if the overlapping size is defined beforehand, the external device can perform the overlapping area treatment process in accordance with the predefined overlapping size, and thus it is not necessary to send any information other than the image data to the external device.

Alternatively, in the case in which the image taking apparatus does not perform the overlapping area treatment process, the data indicating the overlapping size may be supplied together with the image data each time the image data is output to the external device. Still alternatively, the overlapping size may be predefined as a function of the total image size of the image to be output, or the overlapping size may be fixed to a particular value regardless of the total image size.

Figure 6:
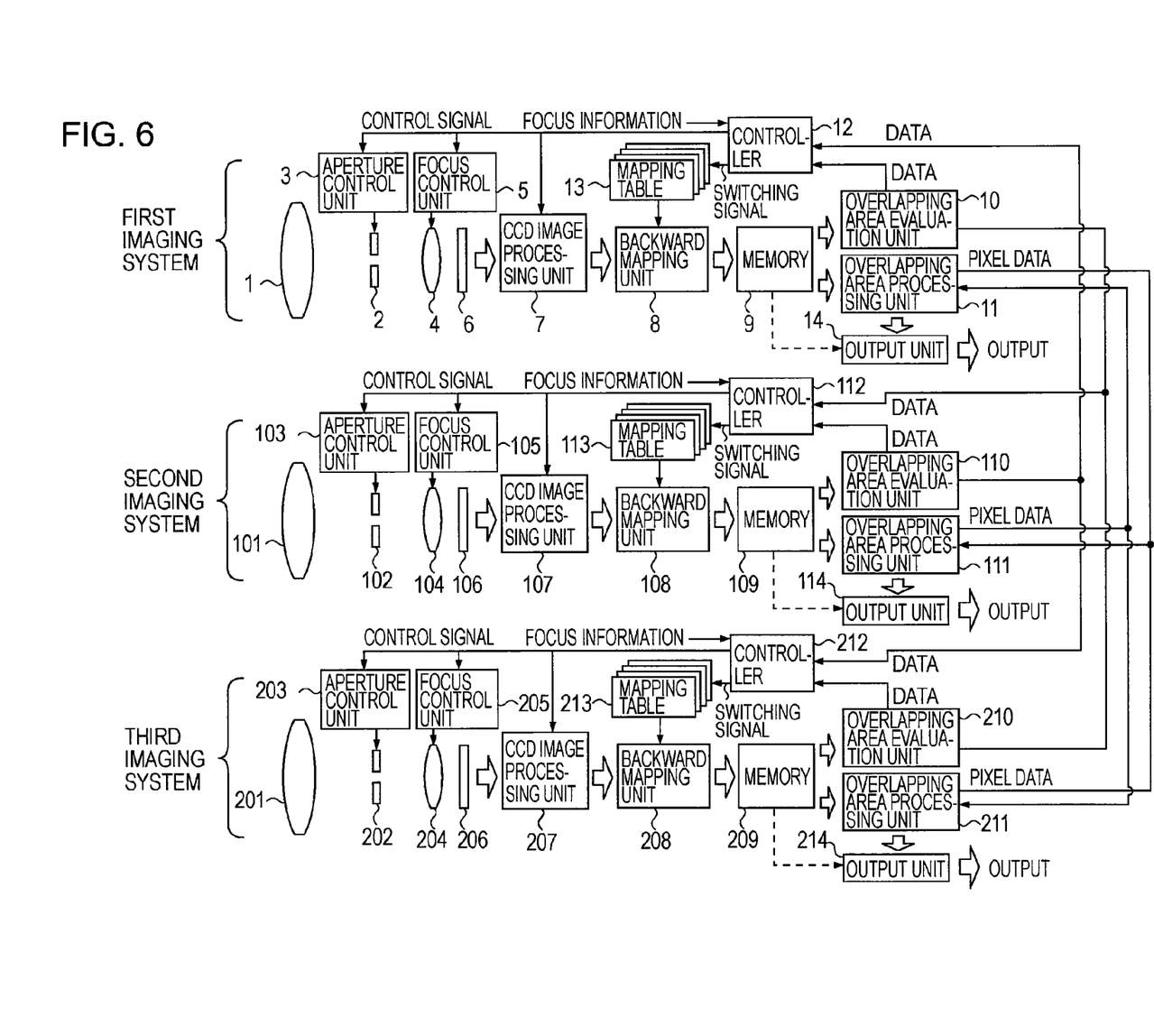
FIG. 6 is a block diagram of an image taking apparatus including three imaging systems according to an embodiment.
Figure 7:
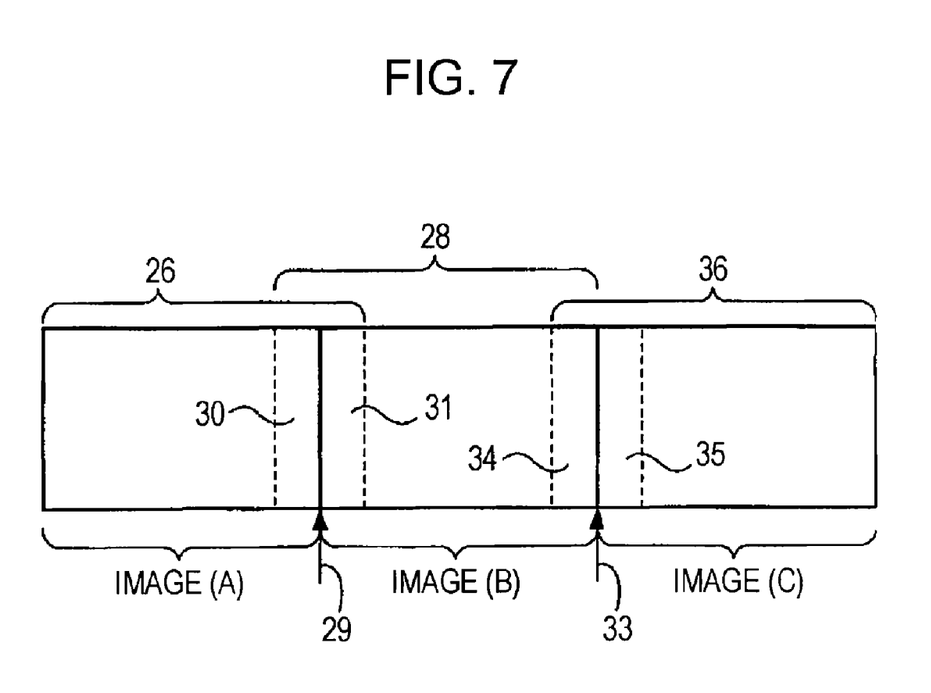
FIG. 7 is a diagram showing an image obtained by developing three output images onto a plane according to an embodiment.

Other embodiments are described below with reference to FIGS. 6 and 7. In FIGS. 6 and 7, similar parts to those in FIG. 1 or 5 are denoted by similar reference numerals, and they are not explained in further detail herein.

FIG. 6 shows an image taking apparatus including three imaging systems each of which is similar to the two imaging systems shown in FIG. 1. The third imaging system includes an imaging optical system including lenses 201 and 204, an aperture 202, and a CCD 206 serving as an image sensing device, a CCD image processing unit 207, a backward mapping unit 208, a rewritable nonvolatile memory 209, an overlapping area evaluation unit 210, an overlapping area processing unit 211, a controller 212 a mapping table set 213, and an output unit 214. These parts are similar to those of the first or second imaging system described above, and thus a duplicated explanation thereof is omitted herein.

In the present example, the image taking apparatus is configured such that transmission of data is allowed not only between the first and second imaging systems, but it is allowed to transmit various kinds of data between the second and third imaging systems. That is, as shown in FIG. 6, the data indicating the result of the evaluation made by the overlapping area evaluation unit 110 of the second imaging system is input to the controller 112 of the second imaging system and also to the controller 212 of the third imaging system, and the data indicating the result of the evaluation made by the overlapping area evaluation unit 210 of the third imaging system is input to the controller 212 of the third imaging system and also to the controller 112 of the second imaging system. In accordance with the evaluation results, the controllers 112 and 212 of the second and third imaging systems adjust the image quality so that the difference in color in the overlapping areas is minimized.

Each of the overlapping area processing units 111 and 211 of the second and third imaging systems supplies the RGB pixel data of the overlapping area to the other overlapping area processing unit. Each of the overlapping area processing units 111 and 211 analyzes the received pixel data in terms of the size and the image quality of the overlapping area of the adjacent imaging system and properly performs the process on the overlapping area in accordance with the analysis result.

FIG. 7 shows an image obtained by developing three images on a cylindrical surface onto a plane. Note that the developed image is similar to that shown in FIG. 5 except that it includes an additional image (C) obtained by the third imaging system. In the third imaging system, the mapping data 36 of the image (C) is obtained by mapping the image taken by the CCD 206 of the third imaging system into a particular coordinate system in accordance with a mapping table corresponding to the focal distance employed in the image taking operation, in a similar manner to the mapping data 26 or 28 of the image (A) or (B).

The mapping data 28 of the image (B) mapped by the backward mapping unit 108 of the second imaging system includes the image (B) with the standard image size as measured on the display and the image of the overlapping area 35 where the image overlaps the adjacent image (C) of with the standard image size as measured on the display of the third imaging system. Similarly, the mapping data 36 of the image (C) mapped by the backward mapping unit 208 of the third imaging system includes the image (C) with the standard image size as measured on the display and the image of the overlapping area 34 where the image overlaps the adjacent image (B) of with the standard image size as measured on the display of the second imaging system.

As with the images of the first and second imaging systems, the image taken by the second imaging system extends beyond a connection boundary 33 into the overlapping area 35 in which the image overlaps of the image (C) with the standard image size as measured on the display taken by the third imaging system, while the image taken by the third imaging system extends beyond the connection boundary 33 into the overlapping area 34 in which the image overlaps the image (B) with the standard image size as measured on the display taken by the second imaging system, wherein the size of the overlapping area 34 is set to be equal to the size of the overlapping area 35.

Furthermore, as with the images of the first and second imaging systems, the two images are very precisely aligned with respect to each in the overlapping areas 34 and 35, and the aperture 102 (or 202) and the CCD image processing unit 107 (or 207) are controlled in accordance with the result of the evaluation of the image in the overlapping area in which the image overlaps the image with the standard image size as measured on the display taken by the adjacent imaging system, so that the difference in color between the second and third imaging systems is minimized.

Furthermore, as with the images of the first and second imaging systems, each of the overlapping area processing units 111 and 211 of the second and third imaging systems supplies the RGB pixel data of the overlapping area to the other overlapping area processing unit (FIG. 6). Each of the overlapping area processing units 111 and 211 analyzes the received pixel data in terms of the size and the image quality of the overlapping area of the adjacent imaging system and properly performs the process on the overlapping area in accordance with the analysis result.

Thus, it is possible to precisely connect three images taken by the first to third imaging systems. Similarly, it is also possible to precisely connect four or more images taken by an image taking apparatus including four or more imaging systems via overlapping areas with a fixed size.

As described above, in the image taking apparatus such as a multi-lens camera or an omnidirectional camera adapted to acquire a wide-angle image by connecting images output from a plurality of imaging systems, in particular, in the image taking apparatus in which the imaging systems are disposed such that images taken by the imaging systems partially overlap each other, a set of backward mapping tables which cover an area including an image with the standard image size as measured on the display and an overlapping area and which are switchable or rewritable is stored in a unit disposed at a stage following each CCD, and the mapping table is switched depending on the focus (focal distance) such that output images taken by adjacent imaging systems can be precisely connected to each other via an overlapping area regardless of the focus value. That is, the backward mapping table is dynamically switched depending on a change in the focus value so that the overlapping area of the image data is precisely mapped to a particular area regardless of the focus value.

The overlapping part of each image is very precisely mapped to the particular area and the data in this area is evaluated with respect to the adjacent image. In accordance with the result of the evaluation, the CCD image processing unit and the aperture are controlled so that the difference in color between the data output from the CCD image processing units of the adjacent imaging systems is precisely corrected.

A block (overlapping area processing unit) for performing a boundary treatment process such as a blending process in accordance with the overlapping data supplied from adjacent imaging systems is disposed at a stage following the backward mapping unit for performing the mapping in accordance with a selected backward mapping table, whereby the boundary treatment process is performed on the image data by the overlapping area processing unit of each imaging system, and the resultant image data is output to an external device. Thus, the external device is allowed to obtain an image with a desired angle of view simply by placing the images side by side.

Thus, in the image taking apparatus such as a multi-lens camera or an omnidirectional camera adapted to obtain a wide-angle image by connection images output from a plurality of imaging systems, it is possible to obtain high-quality image with no blurring in the boundary area between adjacent imaging systems regardless of the focus setting.

By exchanging the data of the backward mapping table, it is possible to easily obtain a mirror-inverted image, a vertically flipped image, or other converted images. In the present application, there is no particular restriction on the relative locations of the imaging systems of the image taking apparatus. That is, instead of arranging imaging systems in a horizontally line, they may be vertically arranged. There is no particular restriction also on the number of imaging systems, because the image subjected to the mapping process is output separately from each imaging system. That is, it is allowed to arrange as many imaging systems in the image taking apparatus as needed to obtain a desired angle of view.

Although in the embodiments described above, it is assumed that the present application is applied to a co-viewpoint multiple optical system camera such as that disclosed in Japanese Patent No. 2974500, the present application may also be applied to an image taking apparatus in which a plurality of cameras (imaging systems) are simply disposed in parallel, because viewpoints of a plurality of imaging systems in such an image taking apparatus can be regarded as being coincident with each other when a subject to be taken is at sufficiently distant location.

The present application may also be achieved by supplying a storage medium, on which a software program implementing the functions of any of the embodiments described above is stored, to a system or an apparatus whereby a computer (or CPU or a similar control device) in the system or apparatus reads and executes the program code stored on the storage medium.

Specific examples of storage media which can be used in the present application to supply the program code include a floppy disk, a hard disk, an optical disk, a magneto-optical disk, a CD-ROM disk, a CD-R disk, a magnetic tape, a non-volatile memory card, and a ROM.

When one or more functions according to one of or a mixture of the above-described embodiments according to the present application are realized by executing the program code on a computer, the operating system (OS) running on the computer may execute all or part of the process in accordance with the program code. Note that the realization in such a manner also falls within the scope of the present application.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An image taking apparatus comprising a plurality of imaging means each including a lens with a variable focal distance and an image sensing device, the plurality of imaging means being disposed such that their viewpoints are substantially coincident with each other and image areas partially overlap each other so as to allow it obtain a wide angle image by connecting a plurality of images obtained by the respective imaging means, each imaging means including:
a set of a plurality of mapping tables prepared for various respective values of the focal distance, each mapping table representing the correspondence for one of the various values of the focal distance between a particular coordinate system and a coordinate system in which an image taken by each image sensing device is represented;
a controller adapted to select a mapping table corresponding to a focal distance used to take images by the image sensing devices; and
a mapping unit adapted to map each image into the particular coordinate system in accordance with the correspondence described in the mapping table selected by the controller.

2. The image taking apparatus according to claim 1, wherein the mapping tables in the set of mapping tables are prepared for respective different values off the focal distance, each mapping table representing, for one of various different focal distances, the correspondence in mapping from an image taken by each image sensing device to a non-planar image in a three-dimensional coordinate system or further to a two-dimensional plane image.

3. The image taking apparatus according to claim 1, wherein the image taken by each image sensing device includes an image with a standard image size as measured on a display that is a unit of a wide-angle image composed of a plurality of units and further includes an image in an overlapping area in which the image overlaps an image with the standard image size as measured on the display taken by adjacent imaging means, the size as measured on the display of the image in the overlapping area being maintained fixed regardless of the focal distance.

4. The image taking apparatus according to claim 1, wherein in first and second imaging means adjacent to each other,
an image taken by the first imaging means extends, beyond a connection boundary with an image with the standard image size as measured on a display taken by the second imaging means, into a first overlapping area in which the image taken by the first imaging means overlaps the image taken by the second imaging means, and
the image taken by the second imaging means extends, beyond the connection boundary with the image with the standard image size as measured on the display taken by the first imaging means, into a second overlapping area in which the image taken by the second imaging means overlaps the image taken by the first imaging means, the first overlapping area having the same size as the size of the second overlapping area.

5. The image taking apparatus according to claim 3, wherein each imaging means acquires, from adjacent imaging means, a result of an evaluation of an overlapping part between the image with the standard image size as measured on the display taken by the current imaging means and the image taken by the adjacent imaging means, and corrects a difference in color of the overlapping part with respect to the color of the image taken by the adjacent imaging means on the basis of the acquired evaluation result.

6. The image taking apparatus according to claim 5, wherein each imaging means further includes
an aperture, and
an overlapping area evaluation unit adapted to evaluate an overlapping part between an image with the standard image size as measured on the display taken by the present imaging means and an image taken by adjacent imaging means,
and wherein the controller of each imaging means adjusts the aperture value of the imaging means and/or the image quality of the image taken by the image sensing device so that the difference in color is minimized in accordance with the evaluation result supplied from the overlapping area evaluation unit of the adjacent imaging means.

7. The image taking apparatus according to claim 3, wherein each imaging means sends, to the other imaging means, pixel data of the image in the overlapping area in which the image with the standard image size as measured on the display taken by the imaging means overlaps the image taken by the adjacent imaging means, each imaging means receives pixel data sent from the other imaging means, and each imaging means performs a blending process on the image in the overlapping area in accordance with the received pixel data.

8. The image taking apparatus according to claim 7, wherein
each imaging means further includes an overlapping area processing unit adapted to perform a blending process on the overlapping part between the image with the standard image size as measured on the display taken by the imaging means and the image taken by the adjacent imaging means, and
the overlapping area processing unit acquires the pixel data from the adjacent imaging means, performs the blending process on the overlapping part, and outputs the image with the standard image size as measured on the display including the overlapping part subjected to the blending process.

9. An image processing method of obtaining a wide-angle image by connecting images taken by a plurality of imaging means each including a lens with a variable focal distance and an image sensing device, the plurality of imaging means being disposed such that their viewpoints are substantially coincident with each other and image areas partially overlap each other, comprising:

selecting a mapping table from a set of a plurality of mapping tables prepared for various respective values of the focal distance used in an image taking operation, each mapping table representing the correspondence for one of the various values of the focal distance between a particular coordinate system and a coordinate system in which an image taken by each image sensing device is represented; and mapping each image taken by each image sensing device into the particular coordinate system in accordance with the correspondence described in the selected mapping table, so that the image mapped into the particular coordinate system in accordance with the selected mapping table and the image mapped into the particular coordinate system by an adjacent imaging means overlap each other in an overlapping area which is maintained fixed regardless of the focal distance.

10. A computer readable medium storing a computer program for obtaining a wide-angle image by connecting images taken by a plurality of imaging means each including a lens with a variable focal distance and an image sensing device, the plurality of imaging means being disposed such that their viewpoints are substantially coincident with each other and image areas partially overlap each other, the computer program structured to cause a computer to:

select a mapping table from a set of a plurality of mapping tables prepared for various respective values of the focal distance used in an image taking operation, each mapping table representing the correspondence for one of the various values of the focal distance between a particular coordinate system and a coordinate system in which an image taken by each image sensing device is represented; and map each image taken by each image sensing device into the particular coordinate system in accordance with the correspondence described in the selected mapping table so that the image mapped into the particular coordinate system in accordance with the selected mapping table overlaps, in an overlapping area, with an image taken by adjacent imaging means and mapped into the particular coordinate system, the overlapping area being fixed regardless of the focal distance.

11. An image taking apparatus comprising a plurality of imaging units each including a lens with a variable focal distance and an image sensing device, the plurality of imaging units being disposed such that their viewpoints are substantially coincident with each other and image areas partially overlap each other so as to allow it obtain a wide angle image by connecting a plurality of images obtained by the respective imaging means, each imaging unit including:

a set of a plurality of mapping tables prepared for various respective values of the focal distance, each mapping table representing the correspondence for one of the various values of the focal distance between a particular coordinate system and a coordinate system in which an image taken by each image sensing device is represented;

a controller adapted to select a mapping table corresponding to a focal distance used to take images by the image sensing devices; and a mapping unit adapted to map each image into the particular coordinate system in accordance with the correspondence described in the mapping table selected by the controller.

* * * * *